United States Patent
Proffit et al.

(10) Patent No.: US 8,527,645 B1
(45) Date of Patent: Sep. 3, 2013

(54) DISTRIBUTING TRANSCODING TASKS ACROSS A DYNAMIC SET OF RESOURCES USING A QUEUE RESPONSIVE TO RESTRICTION-INCLUSIVE QUERIES

(71) Applicant: Limelight Networks, Inc., Tempe, AZ (US)

(72) Inventors: Spencer Proffit, Vashon, WA (US); Huw Morgan, Seattle, WA (US); Michael Asavareungchai, Sammamish, WA (US); Sean Cassidy, Seattle, WA (US); Brandon Smith, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/651,663

(22) Filed: Oct. 15, 2012

(51) Int. Cl.
*G06F 15/16* (2006.01)
(52) U.S. Cl.
USPC ............ 709/229; 718/103; 718/104; 719/314
(58) Field of Classification Search
USPC ................................................ 709/200, 217
See application file for complete search history.

(56) References Cited

U.S. PATENT DOCUMENTS

| | | | |
|---|---|---|---|
| 4,961,224 A | 10/1990 | Yung | |
| 7,076,781 B2* | 7/2006 | Skovira | 718/102 |
| 7,467,387 B2* | 12/2008 | Mayes et al. | 719/314 |
| 7,680,897 B1* | 3/2010 | Carter et al. | 709/217 |
| 7,877,330 B2 | 1/2011 | Siegel et al. | |
| 8,126,195 B2* | 2/2012 | Landers et al. | 382/100 |
| 8,291,083 B2 | 10/2012 | Black et al. | |
| 2003/0191795 A1* | 10/2003 | Bernardin et al. | 709/105 |
| 2004/0073596 A1* | 4/2004 | Kloninger et al. | 709/200 |
| 2005/0138143 A1 | 6/2005 | Thompson | |
| 2009/0300632 A1* | 12/2009 | Falcon et al. | 718/103 |
| 2010/0131674 A1* | 5/2010 | Vecchio et al. | 709/246 |
| 2011/0188577 A1* | 8/2011 | Kishore et al. | 375/240.16 |
| 2012/0089700 A1* | 4/2012 | Safruti et al. | 709/217 |
| 2012/0191876 A1* | 7/2012 | Johnson et al. | 709/246 |
| 2012/0246695 A1 | 9/2012 | Cameron | |

OTHER PUBLICATIONS

Jaison Paul Mulerikkal, "An Architecture for Distributed Content Delivery Network" Retrieved on Dec. 5, 2012 from http://citeseerx.ist.psu.edu/viewdoc/download?doi=10.1.1.127.5309&rep=rep1&type=pdf, Jul. 17, 2007.

* cited by examiner

*Primary Examiner* — Dustin Nguyen
(74) *Attorney, Agent, or Firm* — Kilpatrick Townsend & Stockton LLP

(57) ABSTRACT

A method and system for performing processing tasks is disclosed. At a resource, a detection is made as to when the resource is available to perform a processing task. Usage of the resource for performing processing tasks associated with each client of a set of clients is monitored. A restriction limiting which processing task is to be assigned to the resource is identified. The restriction identifies a hierarchy amongst at least two clients of the set of clients. The hierarchy is based on the monitored usage. A query identifying the restriction is generated. The query is transmitted to a remote queue in communication with a plurality of independent resources. The plurality of independent resources includes the resource. A response is received from the queue. The response identifies a processing task.

19 Claims, 11 Drawing Sheets

DISTRIBUTING TRANSCODING TASKS ACROSS A DYNAMIC SET OF RESOURCES USING A QUEUE RESPONSIVE TO RESTRICTION-INCLUSIVE QUERIES

BACKGROUND

This disclosure relates in general to coordinating performance of tasks pertaining to electronic content files across a set of independent resources. Specifically, tasks related to multiple transcoding efforts can be prioritized and assigned to different resources based on the priorities.

Frequently, digital files are transcoded to, e.g., conform the file's format to one supported by a device requesting the file or to improve compression performance. Some systems repeatedly transcode files. For example, a system could support a large client base that wishes to transcode files such that the transcoded files can be supplied to webpage viewers. Another system could respond to download file requests from users using different types of user devices (and thus supporting different types of files).

In these instances, limited system resources can result in a transcoding backlog. This backlog is often compounded when the system resources are also relied on from non-transcoding tasks. To deal with the backlog, a queue may be formed, such that tasks (e.g., transcoding tasks) high in the queue are handled before tasks low in the queue. Queues are often managed in a linear and single-chain manner: new tasks are added to a bottom of a queue, a processor handles a task at a top of the queue, the handled task is removed from the queue, and the processor then handles a new task at the top of the queue. This protocol allows for straight-forward management of the queue, but it is not the most efficient technique for handling the tasks.

SUMMARY

In one embodiment, the present disclosure provides a method and system for managing a central queue to coordinate handling of transcoding-related tasks by a set of independent resources. The tasks can include those responsive to predicted requests (e.g., requests for files in need of transcoding before being accessible to a requesting user). As a simple example, a prediction may be made that File X will be frequently requested by users with devices supporting format n. Thus, tasks can include downloading File X, transcoding File X into format n, and uploading the target media file to a destination serving user requests.

A central queue identifies tasks that need to be performed. Tasks can be grouped together into a single queue item (e.g., such that a resource handling one task of the group will also handle other tasks of the group) or can be split across queue items. The grouping or splitting can result in, e.g., narrowing a processing-time distribution across queue items. One or more resources (e.g., processing resources) of a set of resources can perform tasks in a given queue item in queue.

Resources are assigned to specific clients (e.g., content providers). When a resource is available to handle queue item, it sends a query to the queue requesting that assignment of a queue item. The query also specifies a criterion or priority indicating how the queue item is to be chosen over other queue items. For example, a priority can indicate that a queue item should relate to content provided by the client, and—if there are no such queue items—that the queue item should relate to content provided by other providers identified in an order of preference. This order can be identified based on a global policy (e.g., locally enforced at the resources when formatting queries) to attempt to fairly allocate extra resource processing. Thus, e.g., if resource #1 has been performing many queue items for a client #5, but few for client #4, it can indicate a preference in its query to perform queue items related to content provided by client #4 over those related to content provided by client #5.

The queue receives the query and identifies a queue item amongst those available that is most suitable for the resource based on the criterion. The queue then assigns the identified queue item to the resource and sends information about the queue item to the resource. The assignment can include changing a status of the queue item is changed from "open" to "assigned", such that resources do not duplicate efforts with regard to the associated tasks.

The central management of the queue allows for a set of tasks to be seamlessly handled irrespective of how many resources are interacting with the queue. Even as resources are added or removed from a queue-related network, management of the queue remains virtually unchanged. Further, by allowing resources to generate queries with item-selection criteria or policies, clients can individually tailor how tasks are prioritized and handled.

In some embodiments, a content delivery network (CDN) for assigning processing tasks is provided. A first points of presence (POP) at a first geographical location includes a first resource. The first resource is assigned to a first client. The first resource includes a queue manager that detects when the first resource is available to perform a processing task and monitors usage of the first resource for performing processing tasks associated with each of a second client and a third client over a time period. The queue manager further identifies a restriction limiting which processing task is to be assigned to the first resource. The restriction specifies that processing tasks associated with the prioritized client are to be assigned over comparable processing tasks associated with the unprioritized client. The prioritized client is whichever of the second and third clients were associated with less monitored usage. The unprioritized client is the other of the second and third client. The queue manager also generates a query identifying the restriction and transmits the query to a queue. A second POP at a second geographical location includes a second resource. The second resource is assigned to a second client. A third POP at a third geographical location includes a third resource. The third resource is assigned to a third client. A queue includes a set of queue items. Each queue item is associated with a client. Each queue item identifies a processing task. The queue responds to queries from each of the first, second and third resources and, upon receipt of the query, selects a queue item from the set of queue items based on the restriction. The queue also assigns the selected queue item to the first resource and transmits a response to the first resource, the response identifying a processing task of the selected queue item.

In some embodiments, a resource for performing processing tasks is provided. An availability detector detects when the resource is available to perform a processing task. A local-performance monitor monitors usage of the resource for performing processing tasks associated with each client of a set of clients. A restriction engine identifies a restriction limiting which processing task is to be assigned to the resource. The restriction identifies a hierarchy amongst at least two clients of the set of clients. The hierarchy is based on the monitored usage. A query generator generates a query identifying the restriction. A queue communicator transmits the query to a remote queue in communication with a plurality of independent resources. The plurality of independent resources includes the resource. The queue communicator further receives a response from the queue, the response identifying a processing task.

In some embodiments, a method for performing processing tasks is provided. At a resource, a detection is made as to when the resource is available to perform a processing task. Usage of the resource for performing processing tasks associated with each client of a set of clients is monitored. A restriction limiting which processing task is to be assigned to the resource is identified. The restriction identifies a hierarchy amongst at least two clients of the set of clients. The hierarchy is based on the monitored usage. A query identifying the restriction is generated. The query is transmitted to a remote queue in communication with a plurality of independent resources. The plurality of independent resources includes the resource. A response is received from the queue. The response identifies a processing task.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
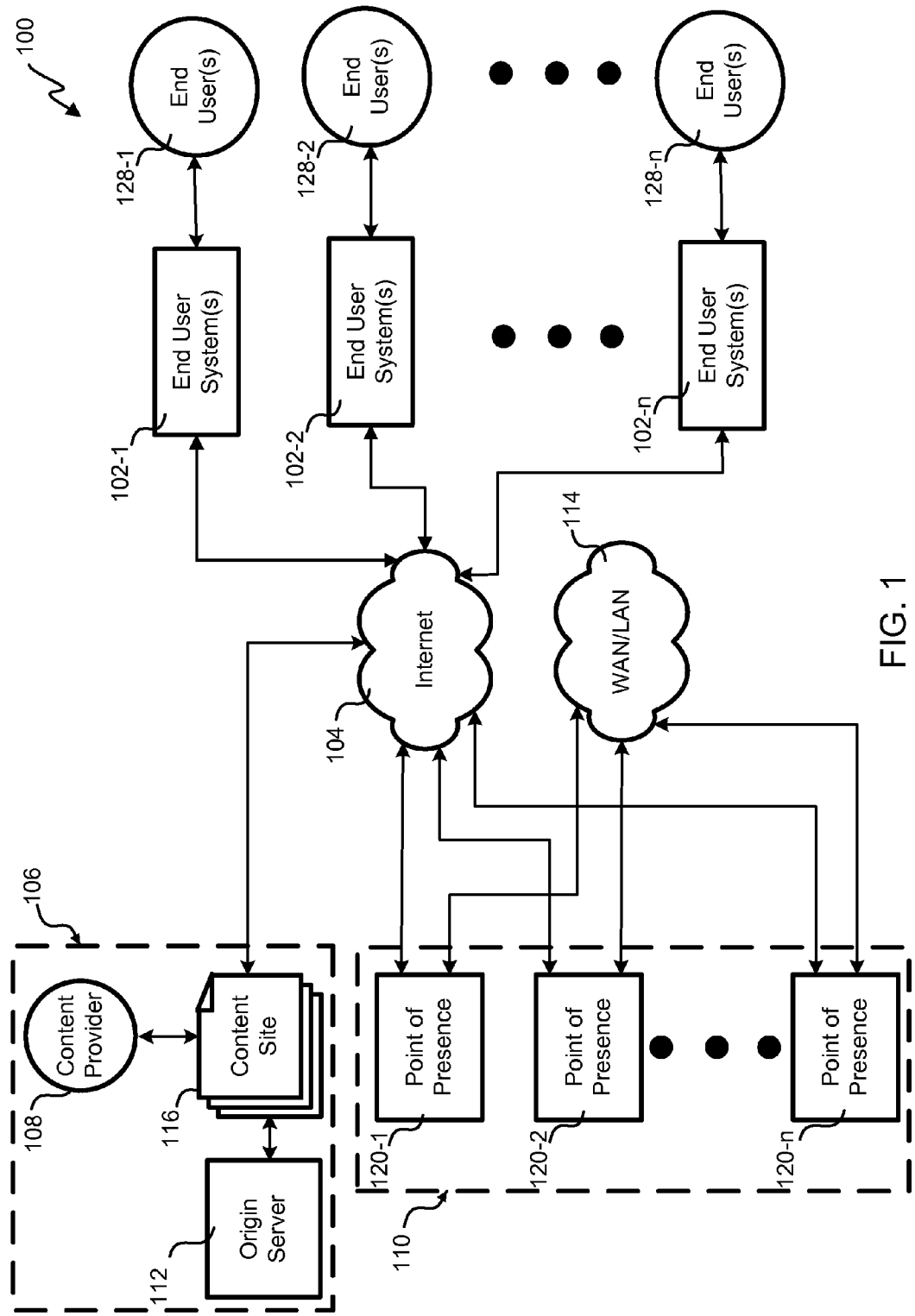
FIG. 1 depicts a block diagram of an embodiment of a content distribution system.

Referring first to FIG. 1, a block diagram of an embodiment of a content distribution system 100 is shown. A content originator 106 produces and/or distributes content objects and includes a content provider 108, a content site 116, and an origin server 112. Content originator 106 offloads delivery of the content objects to a content delivery network (CDN) 110 in this embodiment. CDN 110 can respond to user requests by, e.g., accessing and processing requested content. Thus, as described further below, CDN 110 can include components that identify tasks to be performed, prioritize these tasks and distribute workload of the tasks across a set of resources.

CDN 110 can both cache and/or host content in various embodiments for third parties to offload delivery and typically provide better quality of service (QoS) to a broad spectrum of end user systems 102 distributed worldwide. Content originator 106 is the customer of the CDN 110 and an end user 128 benefits from improvements in QoS.

In this embodiment, content distribution system 100 locates the content objects (or portions thereof) and distributes the content objects to an end user system 102. The content objects are dynamically cached within the CDN 110 and/or hosted by the CDN 110. A content object is any content file, content stream or a range defining a segment of a content file or content stream and could include, for example, video, pictures, data, audio, software, and/or text. The content object could be live, delayed or stored. The range defining a segment could be defined as a byte range or time range within the playback. Throughout the specification, references may be made to a content object, content, content stream and/or content file, but it is to be understood that those terms could be used interchangeably wherever they may appear.

Many content providers 108 use a CDN 110 (or multiple CDNs) to deliver the content objects over the Internet 104 to end users 128. Content providers 108 can pay for this service, and different types or quality of service can be provided, e.g., based on specific contracts or prices paid by content providers 108. Content providers 108 can further interact with CDN 110, e.g., to request that specific processing be performed on their content, to specify policies regarding the processing (e.g., prioritizing a first type of processing over a second or to ensure that the processing is only handled by specific resources or resources of a specific type), or to specify policies regarding use of resources assigned to (e.g., paid for by) the content provider.

CDN 110 includes a number of points of presence (POPs) 120, which are geographically distributed through the content distribution system 100 to deliver content with lower latency. Various embodiments may have any number of POPs 120 within the CDN 110 that are generally distributed in various locations around the Internet 104 so as to be proximate to end user systems 102. Multiple POPs 120 use the same IP address such that an Anycast routing scheme is used to find a POP likely to be close to the end user, in a network sense, for each request. In addition to the Internet 104, a wide area network (WAN) and/or local area network (LAN) 114 or other backbone may couple the POPs 120 with each other and also couple the POPs 120 with other parts of CDN 110. Distributed storage, processing and caching is provided by CDN 110.

When an end user 128 requests a web page (or other content) through its respective end user system 102, the request for the web page is passed either directly or indirectly via the Internet 104 to content originator 106. Content originator 106 is the source or re-distributor of content objects, i.e., the so-called origin server 112. Content site 116 is an Internet web site accessible by end user system 102. In one embodiment, content site 116 could be a web site where the content is viewable with a web browser. In other embodiments, content site 116 could be accessible with application software other than a web browser. Content provider 108 directs content requests to a CDN 110 after they are made or formulates the delivery path by embedding the delivery path into the universal resource indicators (URIs) for a web page. In any event, the request for content is handed over to CDN 110 in this embodiment by using an Anycast IP address corresponding to two or more POPs 120. In some embodiments, CDN 110 hosts content objects and/or web pages to be the origin server.

Once the request for a content object is passed to CDN 110, the request is associated with a particular POP 120 within CDN 110 using the Anycast routing scheme, but other embodiments could use routing, redirection or DNS to shunt requests to a particular POP 120. It is noted that CDN 110 processes requests for content in the application layer of the open systems interconnection (OSI) model with URIs, URLs and HTTP. The particular POP 120 may retrieve the portion of the content object from content provider 108 where it is acting as the origin server. Alternatively, content provider 108 may directly provide content object to the CDN 110 and its associated POPs 120 through pre-population of caches (i.e., in advance of the first request) or hosting. A storage policy could be defined to specify the conditions under which pre-population is performed. In this embodiment, the content objects are provided to CDN 110 and stored in one or more CDN servers such that the portion of the requested content may be hosted from CDN 110. CDN servers include edge servers in each POP 120 that actually serve end user requests. The origin server 112 holds a copy of each content object for the content originator 106. Periodically, the content of the origin server 112 may be reconciled with the CDN 110 through a caching, hosting and/or pre-population algorithm, for example, through a storage policy. Some content providers could use an origin server within the CDN 110 to host the content and avoid the need to maintain a copy.

Once the content object is retrieved, the content object is processed (e.g., transcoded) and/or stored within the particular POP 120 and is served from that POP to the end user system 102. End user system 102 receives the content object and can further process it for use by the end user 128. End user system 102 could be a personal computer, media player, handheld computer, tablet, pad, Internet appliance, phone, smart phone, IPTV set top, streaming radio or any other device that receives and plays content objects. In some embodiments, a number of the end user systems 102 could be networked together. Although this embodiment only shows a single content originator 106 and a single CDN 110, it is to be understood that there could be many of each in various embodiments.

Figure 2:
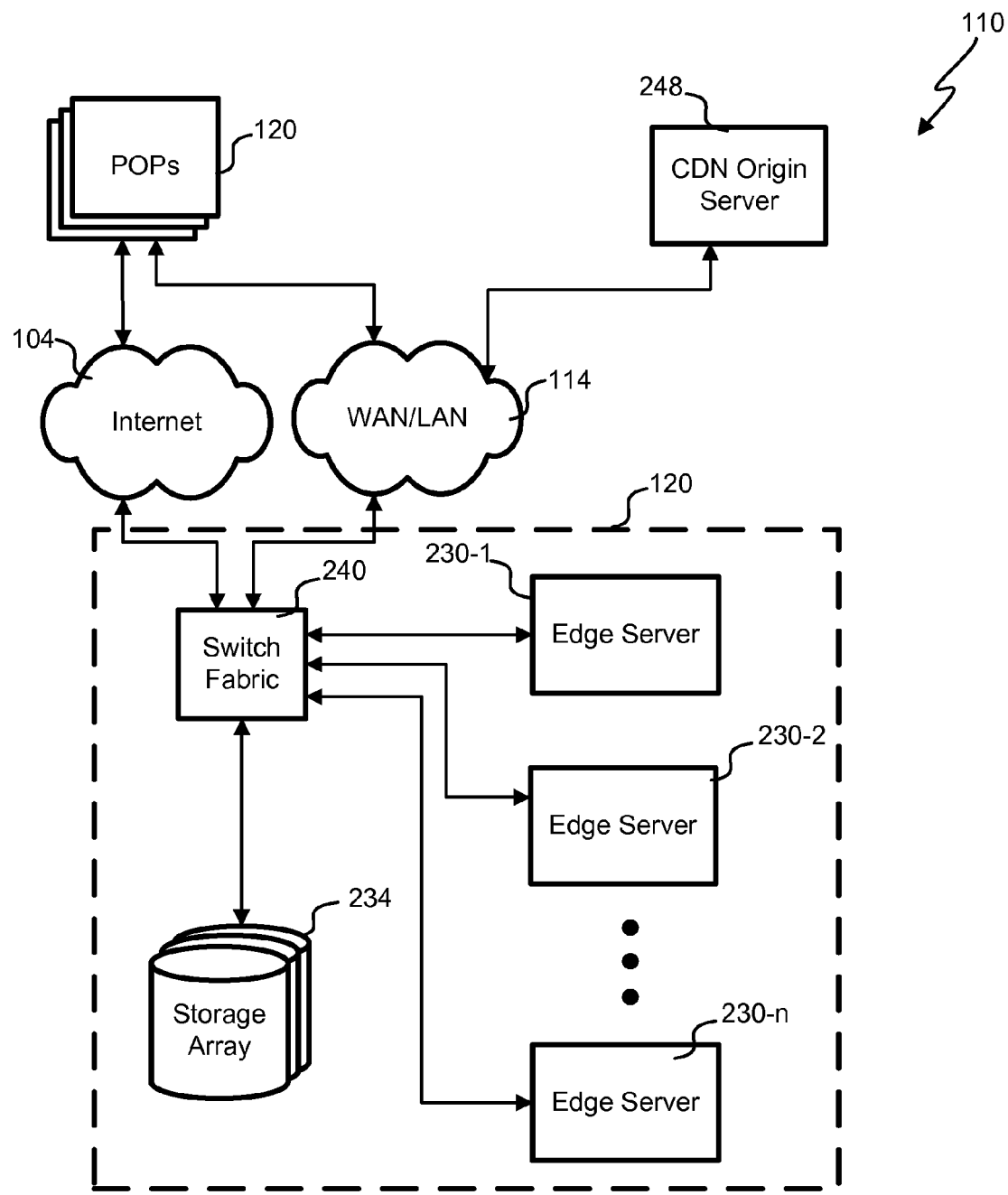
FIG. 2 depicts a block diagram of an embodiment of a content delivery network.

With reference to FIG. 2, a block diagram of an embodiment of a CDN 110 is shown. Although only one POP 120 is shown in detail, there are a number of POPs 120 similarly configured throughout the CDN 110. The POPs 120 communicate through a WAN/LAN 114 and/or the Internet 104 when locating content objects. An interface from the Internet 104 to the POP 120 accepts requests for content objects from end user systems 102. The requests come from an Internet protocol (IP) address of end user device 128 in the form of a URI that causes a HTTP get command. The interface from the Internet 104 to the POP 120 can further accept requests from content providers 108 to perform processing tasks on specific content objects or types of content objects and to define policies regarding processing related to content objects and/or resources associated with the content provider. The requests for content files from CDN 110, requests for processing tasks, or requests policy definitions can pass through the application layer.

A switch fabric 240 assigns the request to one of edge servers 230 according to a routing scheme such as round robin, load balancing, etc. In this embodiment, switch fabric 240 is aware of which edge servers 230 have what capabilities and assigns requests within the group having the capability to store and serve the particular content object referenced in the URI. A protocol such as cache array routing protocol (CARP) is used in this embodiment to disperse the URIs between the group of edge servers 230 to spread out loading. Every time that a particular URI is requested from the group, it is assigned to the same edge server 230 using CARP. The edge servers 230 gathered in a particular group as neighbors can be the other servers in the current POP 120, less loaded servers in the current POP 120, servers having the capability to process the content object, a subset of servers assigned to a customer using the CDN to serve the content object, or some other grouping of servers in POP 120.

In another embodiment, switch fabric 240 assigns the request to one of edge servers 230, which performs CARP to either service the request itself or reassign it to a neighboring edge server 230. Switch fabric 240 sends each packet flow or request to an edge server 230 listed in the configuration of the switch fabric 240. This embodiment does not have awareness of the particular capabilities of any edge server 230. The assignment can be performed by choosing an edge server 230 with the least amount of connections or the fastest response time, but switch fabric 240 in this embodiment assigns the packet flow somewhat arbitrarily using round robin or random methodologies. When the chosen edge server 230 receives the packet flow, an algorithm like CARP is used by the chosen edge server 230 to potentially reassign the packet flow between a group of edge servers 230 to the one edge server 230 dictated by the algorithm. For example, the switch fabric 240 could choose a second edge server 230-2 being the next in the round robin rotation. The second edge server 230-2 would perform CARP on the request and find that the first edge server 230-1 is being assigned this type of request. The request would be reassigned to the first edge server 230-1 to be fulfilled.

In some cases, CDN 110 is used to host content for others. Content providers 108 upload content to a CDN origin server 248. Although only one CDN origin server 248 is shown, it is to be understood that there could be many spread among a number of locations and/or POPs 120. The content object can be stored in CDN origin server 248. CDN origin server 248 serves the content object within CDN 110 to various edge servers 230 in various POPs 120. After the content provider 108 places a content object on the CDN origin server 248, it need not be hosted on origin server 112 redundantly. Although shown separately, it is to be understood that CDN origin sever 248 could be integral to an edge server 230.

Some embodiments include an optional storage array 234 in the POP 120 or elsewhere in CDN 110. Storage array 234 can provide hosting, storage and/or caching. Edge servers 230 can revert to storage array 234 for certain content, for example, very large files or infrequently requested files. Flushing of a cache of an edge server 230 could move the content to storage array 234 until it is ultimately flushed from storage array 234 after which subsequent requests would be fulfilled by an origin server 112 to repopulate the cache in POP 120.

Requests from end user systems 102 are assigned to an edge server 230 that may cache, store or host the requested content object. On occasion, the edge server 230 receiving a request does not have the content object stored for immediate serving. This so-called "cache miss" triggers a process within the CDN 110 to effectively find the content object (or portion thereof) while providing adequate QoS. The content may be found in neighboring edge servers 230 in the same POP 120, in another POP 120, in a CDN origin server 248, in a POP storage array 234, or even an external origin server 112. The various edge and origin servers 230, 248 are grouped for various URIs uniquely. In other words, one URI may look to one group of servers 230, 248 on a cache miss while another URI will look to a different group of servers 230, 248.

Figure 3:
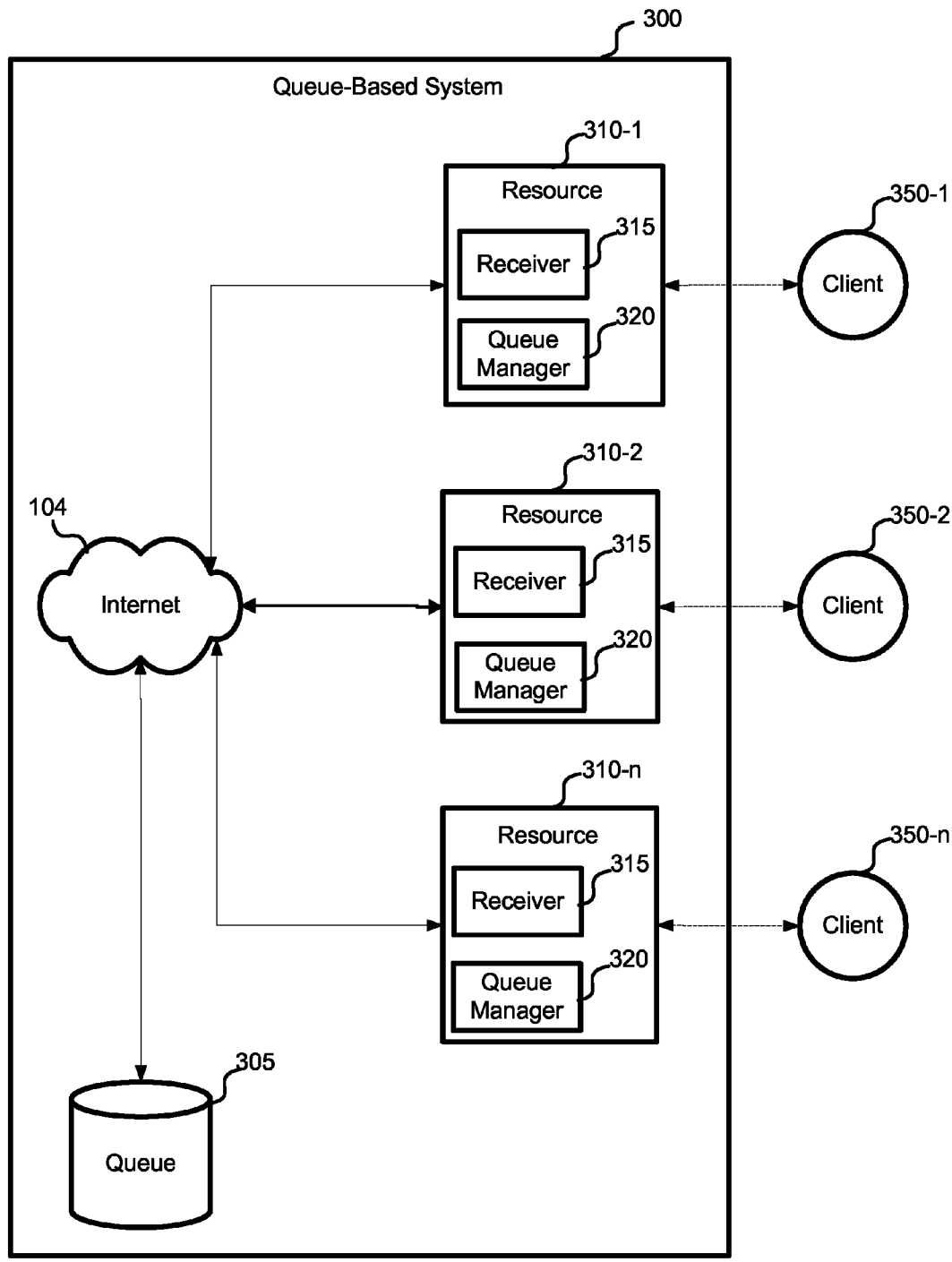
FIG. 3 depicts a block diagram of a queue-based system for managing processing of content objects.

With reference to FIG. 3, a block diagram of a queue-based system 300 for managing processing of content objects is shown. Queue-based system 300 can be part of CDN 110. For example, a POP 120 and/or edge server 120 can include queue-based system 300. Queue-based system 300 includes a set of resources 310, each of which can access queue 305 via the Internet 104 or another network, such as WAN/LAN 114. In some instances, one, some or all resources 310 are within a same POP 120 or CDN 110 as queue 305. In some instances, one, some or all resources 310 are not within a same POP 120 or CDN 110 as queue 305 (e.g., and are instead in a different POP or CDN or not within any CDN). Each resource 310 can include a processor and/or memory and can be configured to perform tasks such as those identified in queue 305. Resources 310 can be located within a same or different geographical or network location and can have same or different capabilities (e.g., processing speed, available or total memory, access to programs, etc.).

Each resource 310 can be associated with (e.g., assigned to) a client 350. FIG. 3 shows an instance in which there is a one-to-one relationship between the resources 310 and clients 350. It will be appreciated that variants are conceived. For example, one, more or each client 350 can be associated with a part of a resource 310 or more than one resource 310. The client-to-resource ratio can also vary across clients 310 based on, e.g., a fee paid by a client 350. For example, different subscription prices can allow a client 350 to be allocated a different number of resources 310. An allocation of a resource 310 to a client 350 can include an exclusive allocation (such that the resource cannot be used to perform other clients' tasks) or a non-exclusive allocation. For non-exclusive allocations, e.g., an assigned client's task can take precedence over all other tasks, but if there are no tasks for the assigned client (or if there are no tasks for the assigned client with a priority level above a threshold), the resource can be used to perform other clients' tasks.

Queue-based system 300 receives requests that originated from clients 350, which can include content providers 108. Specifically, each resource 310 includes a receiver 315. When a client 350 communicates with system 300 to request performance of processing tasks, the communication can be routed to a resource 310, e.g., based on a resource identified by the client or a pseudo-random technique. In some instances, one or more resources 310 are assigned to a client 350, and the client's communications can only be routed to an assigned resource 310. Thus, e.g., if a client pays for a level of service providing three dedicated resources, a processing-task-request communication from the client can be routed to a resource selected from amongst the three using a pseudo-random technique.

The receiver to which the request is routed detects the request and then formulates queue-item-entry instructions based on the request. The instruction formulation can include selecting or generating a processing-task identifier. The processing-task identifier can include, e.g., a number or shorthand for the task (e.g., "DOWNLOAD", "TRANSCODE", "ERRORRESPONSE", "UPLOAD", etc.). Further, the instructions can include processing-task fields, such as a file name, a location where the file is stored, a desired format into which the file is to be transcoded to, a location where the processed file is to be stored, expected processing time, expected requisite storage space associate with the task, a client-importance indicator of the task (e.g., a numerical value along a range), a deadline, etc. For example, the instructions can include an initial and/or desired post-transcoding format of MOV, M2TS, MXF, OGM, RMVB, RM, WMV, QT, WebM, FLV, MOD, TS, TP, DVR-MS, Divx, AVI, WMV, MP4, MPEG-1, MPEG-2, FLV, SWF, MKV, 3GP, 3G2, AVCHD (*.M2TS, *.MTS, *.TOD), HD MKV, HD H.264/MPEG-4 AVC, HD MPEG-2, HD MPEG Transport Stream (*.TS, *.TP, *.M2T), MP3, Flac, WMA, M4A, OGG, WAVE, and AAC.

In some instances, the processing task is associated with one or more constraints. The constraints can be specific to a single task or group of tasks or can apply to all tasks associated with a client. The constraints can be identified based on information in the request or a global or local policy. Examples of constraints can include, e.g., requiring that processing be performed within a specific country or prohibiting processing from being performed by any resource without an identified security feature. In some instances, the constraint can be included as a processing-task field. In some instances, the constraint is identified by the processing-task identifier. For example, if a constraint required that processing be performed in Russia, a "TRANSCODE-RUSSIA" identifier could be identified for a request for transcoding rather than "TRANSCODE". Then, e.g., a search for a processing task for a resource 310 in Russia to preform could include search for both of these identifiers, while a search for a processing task for a resource 310 in Russia to preform could include search for only "TRANSCODE".

After the instructions have been formulated, the formulating receiver 315 transmits the instructions (e.g., via Internet 104 or another network) to queue 305. Queue 305 can then generate one or more queue items based on the instructions. One, more or all queue items can have a one-to-one ratio with processing tasks, such that each queue item includes a single task. In some instances, multiple tasks are grouped together into one queue item or a single task is broken apart into multiple queue items. This grouping or separation can be based on the instructions (e.g., grouping all tasks within the instructions into one queue item, or grouping or separating tasks as specifically identified in the instructions) or can be performed automatically at the queue (e.g., in an attempt to keep expected processing times for each queue item to similar times). The queue item can include one or more processing-task identifiers, one or more processing-task fields, an identifier of a resource sending the instructions, an identifier of a client associated with a resource sending the instructions and/or a date and/or time associated with the queue item (e.g., when the request was received or when the queue item was generated).

Queue 305 then stores the generated queue item in queue 305. Queue 305 can include a database. Entries into the database (e.g., queue items) can be unordered or ordered (e.g., based on when associated instructions were received, an associated client-importance indicator, or an expected processing time).

One, more or each item can include a status, which can include an open status (i.e. the item needs to be performed), an assigned status (i.e., the item has been assigned to a resource which is to be working on the item) or a completed status (i.e., the item has been completed). In some instances, queue 305 includes different lists for queue items with different statuses. Upon generation of the queue item, queue 305 can initially define the item's status as open, as it still needs to be performed.

A given system or network (e.g., a CDN) can include a single queue 305 or more than one queue 305. For example, a CDN can include a first queue in a first POP and a second in a second POP, or a CDN can include a first queue a first edge server and a second queue in a second edge server. Resources 310 may or may not be geographically co-located with a queue 305 associated with the resources.

Each resource 310 further includes a queue manager 320 that determines when the resource is available to perform a task, determines available resource characteristics (e.g., available storage space or applications) and generates a query to send (e.g., via the Internet 104 or another network, such as WAN/LAN 114) to queue 305 requesting an assignment of a queue item. The query can include one or more criteria and/or priorities that queue 305 can user to determine which queue item to assign. The criteria can indicate definitive restrictions (e.g., "will not handle transcoding into .avi format" or "only handles tasks pertaining to content provided by Client X or Y"). The priorities includes relative preferences (e.g., "handle task pertaining to content provided by Client X, if none—then tasks pertaining to content provided by Client Y; if still none, then any task" or "handle oldest task meeting specified criteria"). In some instances, queue manager 320 identifies criteria or priorities by identifying a list of processing tasks that it can perform (e.g., based on policies, capabilities, past performance or other characteristics associated with the resource). For example, a queue manager located in Brazil, with high security features, and capabilities to transcode into MP4 format can identify transcoding tasks such as: "TRANSCODE", "TRANSCODE-BRAZIL", "TRANSCODE-CRYPTO", and "TRANSCODE-MP4". Thus, queue 305 may then assign a queue item with any of these tasks but may not assign a queue item with other transcoding tasks such as "TRANSCODE-AUSTRALIA" or "TRANSCODE-AVI".

The criteria and/or priorities can be determined based on global policies, local capabilities, client policies and/or empirical local performance. A global policy can apply to a set of resources or all resources and can be defined, e.g., by a user managing queue-based system 300. For example, a global policy could indicate that a resource is to be used for processing tasks of a client associated with the resource when possible, but that if no such task is available, a task from another client is to be assigned. The policy could further indicate that the another client is to be selected as the client with an available task which has least utilized the resource over a recent time period. A local capability can identify a resource's processing speed, applications accessible to the resource, or available storage space. A criterion could then identify types of tasks that the resource can or cannot perform based on the capabilities. A client policy can apply to a single resource or a group of resources associated with the client. For example, a client policy could indicate that no tasks are to be performed for competitor clients (e.g., specifically identified or identified based on a client characteristic) or could indicate that tasks related to transcoding into a .mov format are to take precedence over tasks related to transcoding into a .avi format. Empirical local performance can relate to types of tasks performed and/or how they were performed. For example, a client policy (e.g., for Client #1) could indicate that tasks for Client #3 are to be prioritized over tasks for Client #2, as Client #2 has used the resource more to date than Client #3. As another example, a client policy could indicate that it is not to receive tasks to transcode audio files, as it frequently produces errors (or consumes the resource for an above-threshold amount of time). Clients 350 can thus interact with the resources 310 to set client policies. For example, clients can interact with resources via the Internet 104 or another network, such as WAN/LAN 114.

Upon receiving a queue-item request from a resource 310, queue 305 can identify a suitable queue item based on any criteria and/or priorities (e.g., identified acceptable processing tasks meeting the criteria) in the request and based on available (e.g., open) queue items. Queue 305 can then transmit information about the queue item (e.g., tasks to be performed, where an initial content object is stored and where a processed version of the content object is to be stored) over the Internet 104 or another network to the applicable resource 310.

Queue 305 can update queue 305 to indicate that the queue item has been assigned. This updating can include, e.g., changing a status of the assigned item from "open" to "assigned" or moving the assigned item from an open list to an assigned list. The updating can further include identifying when the assignment occurred and which resource 310 was assigned to the item.

Queue manager 320 of an assigned resource 310 can notify queue manager 305 when an assigned task has been completed. Queue 305 is then updated to reflect the completion (e.g., by updating a status, moving the item from an assigned list to a completed list or removing the item from queue 305). In some instances, a queue manager 320 confirms with queue 305 that it is continuing to work on an assigned task. For example, queue manager 320 can send such confirmations at routine intervals (e.g., every 15 minutes, 30 minutes, hour, 4 hours, day, etc.). If queue 305 fails to receive an expected confirmation or an indication that the item has been completed, queue 305 can update itself to move the item back to an open state.

Figure 4:
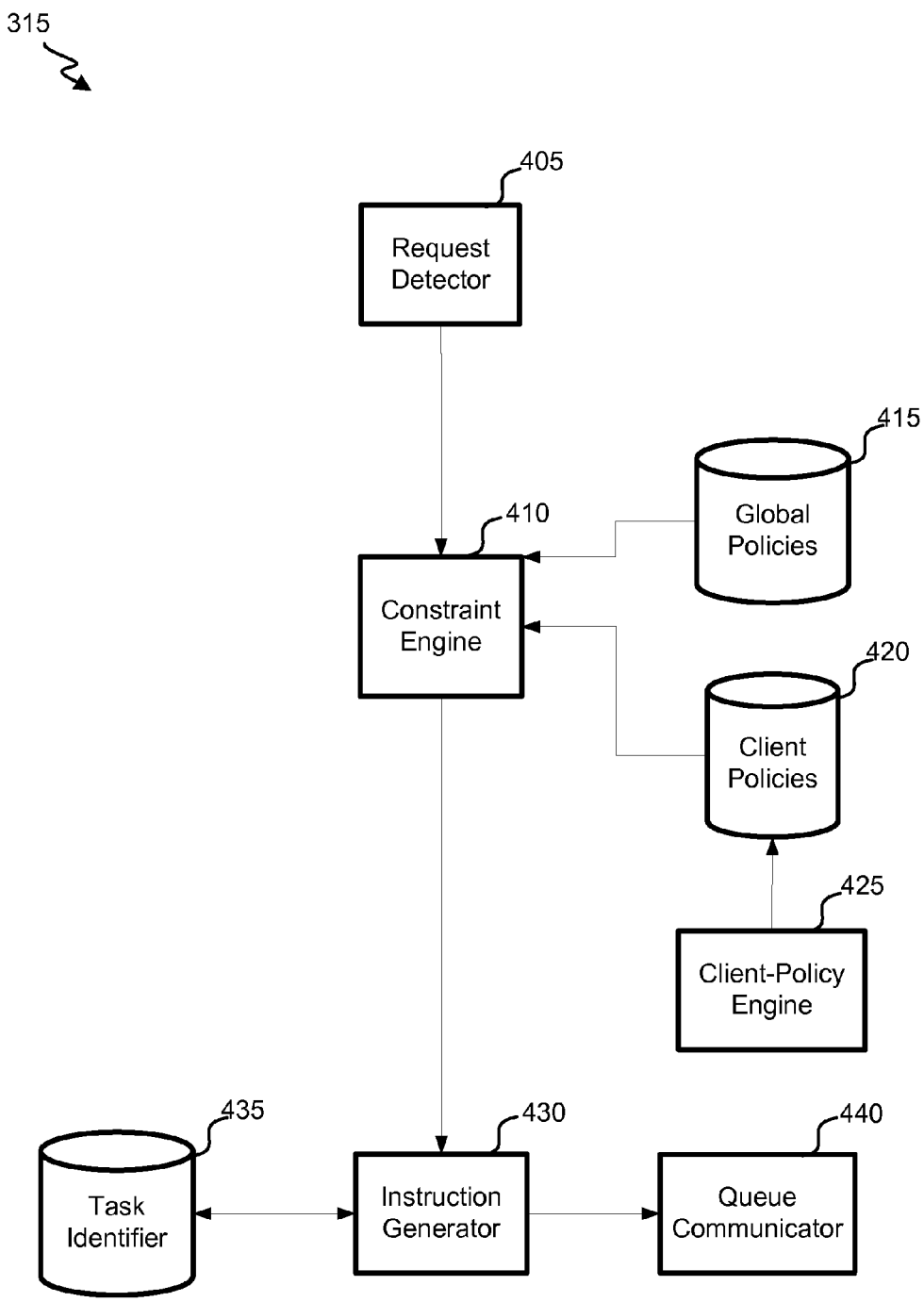
FIG. 4 depicts a block diagram of an embodiment of receiver.

With reference to FIG. 4, a block diagram of an embodiment of receiver 315 is shown. Queue manager 320 includes a request detector 405 that detects a processing-task received from a client 350. The request can identify a content object, a group of content objects or a type of content objects. The request can further identify type of processing, a desired output (e.g., a transcoded format or storage location, a deadline, etc.), an importance indicator, and/or a requesting client.

Upon detecting the request, a constraint engine 410 can identify one or more task constraints applicable to the request-identified processing. The constraints can be identified in the request or determined based on a global or local policy. Thus, constraint engine 410 can consult policies in a global-policy database 415 and/or a client-policy database 420 to identify any applicable policies. Global policies can be set, e.g., by a manager of a network of resources, such as a manager of a CDN including the resources, and client policies can be set by a client. A client-policy engine 425 can detect communications (e.g., assigned to the resource in a manner similar to how task requests are assigned) from a client specifying a type of constraint and can then generate or modify a client policy. In some instances, client-policy engine 425 then relays the communication or client policy to client-policy engines in other resources assigned to the client.

One or more policies can include an applicability condition. For example, some policies can be applicable to processing tasks to be performed on content objects of a given type, to processing types requested by a client associated with a specific level of service, or to specific types of requested processing tasks. Some policies may always be applicable. For example, a client can specify that none of the processing tasks that it requests are to be performed on resources not assigned to the client, or a global policy can indicate that a client cannot request performance of a task if none of the resources assigned have the capability to perform the task. One or more policies can include a constraint, indicating that, when the policy is applicable, a processing task is limited in terms of how, when or by which resource it can be performed.

After constraint engine 410 has detected all applicable constraints, it can resolve any conflicting constraints. For example, if a global policy specifies that transcoding into a high-definition format is to be performed by a resource with a specific piece of software but a client requests that the transcoding be performed by a resource with a different piece of software, then constraint engine 410 can determine that the request constraint is to take priority over the global-policy constraint. The resolution can depend on a fixed hierarchy (e.g., always prioritizing global polices over client policies, always prioritizing request constraints over those in the client or global policies, or the reverse of any of these), or specific policies should indicate whether the policy should take priority or not over another type of constraint.

An instruction generator 430 receives the constraints and generates queue-item-entry instructions. Instruction generator 430 can access a task-identifier 435 database to determine an identifier associated with a requested task. The task identifier can further be determined to be one that identifies a constraint. In some instances, instruction generator 430 generates a task identifier (e.g., appending a stored task identifier with a constraint identifier).

The generated instructions can also include processing-task fields, such as a file name, a location where the file is stored, a desired format into which the file is to be transcoded to, a location where the processed file is to be stored, expected processing time, expected requisite storage space associate with the task, a client-importance indicator of the task (e.g., a numerical value along a range), a deadline, etc. A queue communicator 440 can then transmit the instructions to queue 305.

Figure 5:
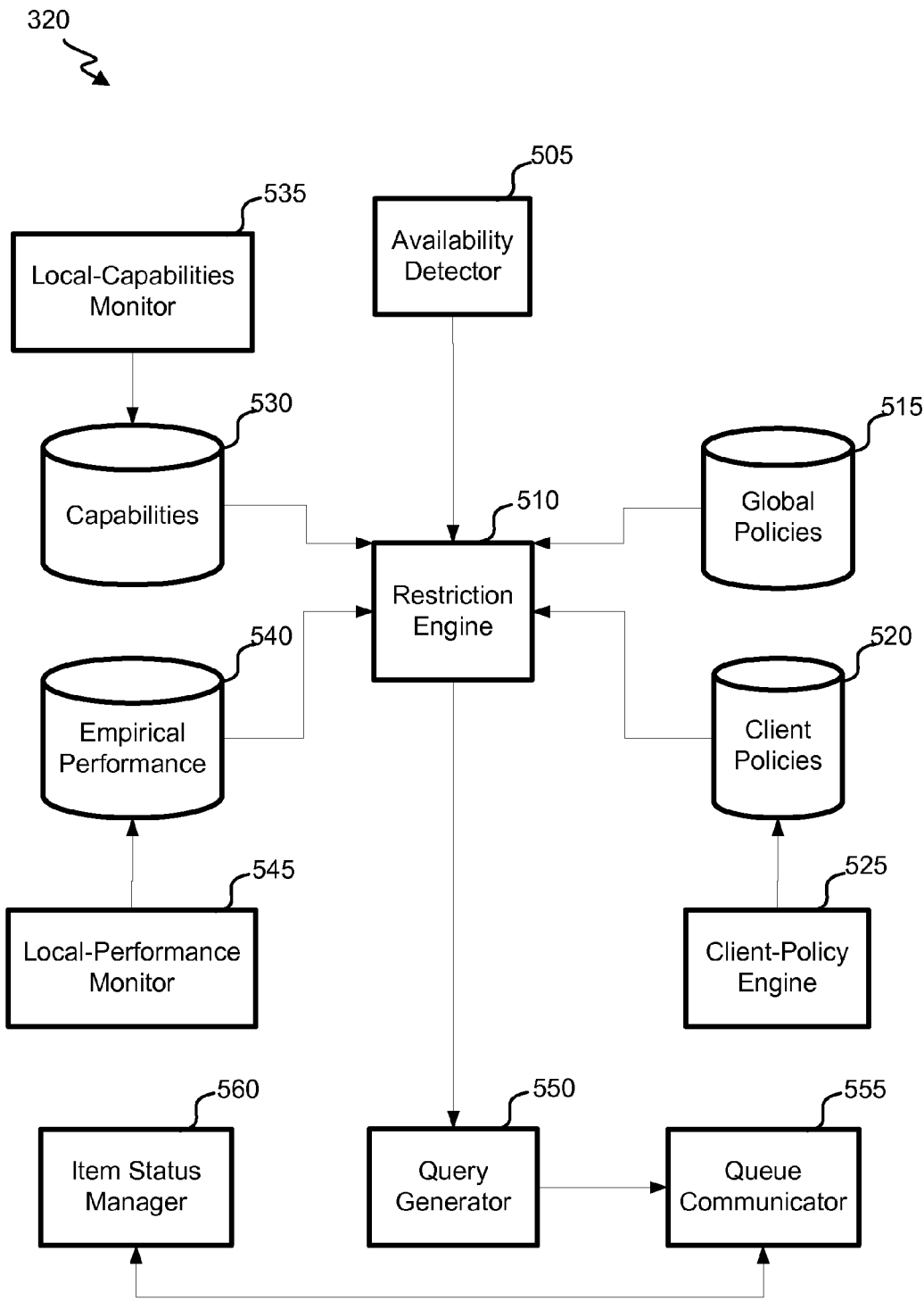
FIG. 5 depicts a block diagram of an embodiment of queue manager.

With reference to FIG. 5, a block diagram of an embodiment of queue manager 320 is shown. Queue manager 320 includes an availability detector 505 that detects when an associated resource 310 is available to perform a processing task. Availability detector 505 can, e.g., monitor an instantaneous or recent time-averaged processor usage and can compare the usage to a threshold to determine whether resource 310 is available.

Upon detecting that a resource is available, a restriction engine 510 can identify one or more task restrictions to include in a task-requesting query to be sent to queue 305. The restrictions can include criteria (requiring that specific task characteristics be included or avoided in an assigned task) and/or priorities (identifying relative preference of a first type of task over a second type of task). A restriction can be determined based on one or more policies and/or one or more pieces of information pertaining to local actual or potential functioning (e.g., past performance or capabilities). Global policies can be set, e.g., by a manager of a network of resources, such as a manager of a CDN including the resources, and client policies can be set by a client. Client policies pertinent to generating a query can be set as they are set for client policies pertinent to generating a queue item (e.g., by routing communications to a client-policy engine 525 that then generates or updates a policy).

As with the global and client policies described in reference to generating a queue item, one or more policies pertinent to generating a query can include an applicability condition. For example, some policies can be applicable to processing tasks to be performed on content objects of a given type, to processing types requested by a client associated with a specific level of service, or to specific types of requested processing tasks. Some policies may always be applicable. One or more policies can include a restriction, indicating that, when the policy is applicable, a resource is to have specific limitations or preferences in terms of which processing task it will perform.

As one example, a global policy can indicate that, if queue 305 does not include any queue items associated with a client assigned to a given resource, a queue item is to be assigned to the resource using a specific strategy (e.g., attempting to fairly distribute use of the resource over a time period amongst all other clients; attempting to fairly distribute use of the resource over a time period amongst a set of other clients, such as those paying for a high quality of service; attempting to distribute use of the resource over a time period based on a weighted measure depending on how many resources are assigned to each other client; preferring old or the oldest queue items; preferring queue items expected to be completed quickly relative to other queue items; and/or preferring queue items expected to use a small amount of memory relative to other queue items).

A policy's condition can depend on whether a resource has a specific capability (e.g., whether a processing speed or available storage space exceeds, or in other instances, is below a threshold or whether a resource has access to a particular software program) or whether a past performance crossed a threshold performance measure (e.g., whether a resource previously performed transcoding into a specific format without receiving an error). Thus, restriction engine 510 can consult a capabilities database 530 and/or an empirical-performance database 540 to determine whether a policy condition is satisfied.

Capabilities database 530 can indicate hardware characteristics of the resource (e.g., processor type), software characteristics of the resource (e.g., operating system or installed programs), and/or whether the resource has access to remote capabilities (e.g., remote transcoding programs). Capabilities can be fixed or dynamic. For example, an available-storage-space capability changes with time and is dynamic. A local-capabilities monitor 535 can monitor current capabilities and update capabilities database 530 at regular intervals or upon detecting a change in capabilities.

Empirical-performance database 540 can indicate a result (e.g., a speed, occurrence of any errors, whether a final desired result was produce) of one or more past processing tasks. A local-performance monitor 545 can monitor a resource's performance of all or some tasks to generate or update the database. Empirical-performance database 540 can include a single entry for each task or can group data for similar or same tasks together and report a statistic (e.g., an average, median, mode or extreme) for the group's performance.

Empirical-performance database 540 can also identify characteristics of queue items performed. For example, empirical-performance database 540 can count a number of queue items performed within a time period for each of a set of clients or having been associated with each of a set of resources. As another example, empirical-performance database 540 can identify a total amount of time spent performing queue items for each of a set of clients or which were associated with each of a set of resources. A global or local policy that limits per-client or per-resource processing (e.g., in an attempt to equally distribute use of the resource amongst all non-assigned clients) could then use this data to determine whether to set task preferences for or against particular clients.

An query generator 550 receives the restrictions and generates a query requesting a queue item. The query can identify characteristics of unacceptable queue items (e.g., types of processing tasks included therein), characteristics of acceptable queue items (e.g., types of processing tasks included therein) and/or queue-item preferences. Thus, in some instances, the query includes a list of acceptable or unacceptable types of processing tasks. The query can include one or more ordered lists, flowcharts, if-then statements, etc. to indicate the queue-item preferences.

The preferences can include preferences for specific types of processing tasks over others or tasks associated with specific clients over others. In one instance, the query indicates that, if there are any queue items with a processing task associated with a client to which a resource is assigned, one of those queue items is to be assigned to the resource (e.g., an oldest queue item, a queue item with a highest-preference type of processing task or a queue item with a highest importance indicator). If not, then if there are any queue items with a processing task associated with another specific client, one of those queue items is to be assigned to the resource A queue communicator 555 can transmit the generated query to queue 305. Upon receiving the query, queue 305 can identify a queue item based on the query (e.g., a best-match or most-preferred item). In instances in which multiple queue items meet the query restrictions, an item can be pseudo-randomly selected from amongst those items. Queue 305 can then change a status of the selected item from opened to assigned and transmit information (e.g., processing tasks and information, such as content-file identifiers an storage locations, associated with the tasks) about the item back to queue communicator 555. Queue communicator 555 can then initiate the resource's processing of tasks identified in the information.

Item status manager 560 can track a resource's performance of tasks in an assigned queue item (e.g., to determine whether the resource is continuing to work on a queue item or whether the queue item has been completed). For example, it can be expected that, while a resource is working on a queue item, it will periodically or at specified times, check in with item status manager 560 to confirm that its continued work on the queue item. If item status manager 560 has not received a check in at an expected time (e.g., 4 hours after an assignment) or within an expected time window, item status manager 560 can estimate that the assigned resource is not operating properly or sufficiently. It can further be expected that a resource will inform item status manager 560 when it completes a queue item. Thus, similarly, if item status manager 560 has not received a completion indication by within a time window or by a time threshold, item status manager 560 can estimate that the assigned resource is not operating properly or sufficiently. Expected check-in times, completion times, etc. can be determined in a same manner for all queue items (e.g., must check-in at least once per hour post-assignment and must complete task within 10 hours from assignment) or can vary across queue items.

Upon estimating that an assigned resource is not operating properly or sufficiently, queue communicator 555 can notify queue 305 of the estimate, such that queue 305 can change a status of the queue item from assigned back to open (e.g., by changing a value of a status field or moving the queue item from an assigned list to an open list). Queue communicator 555 can further instruct resource 310 to stop working on the queue item. Upon receiving a notification from an assigned resource that a queue item has been completed, queue 305 can be updated to change a status of the queue item from assigned to completed (e.g., by changing a value of a status field, moving the queue item from an assigned list to a completed list or removing the queue item from the queue).

Figure 6:
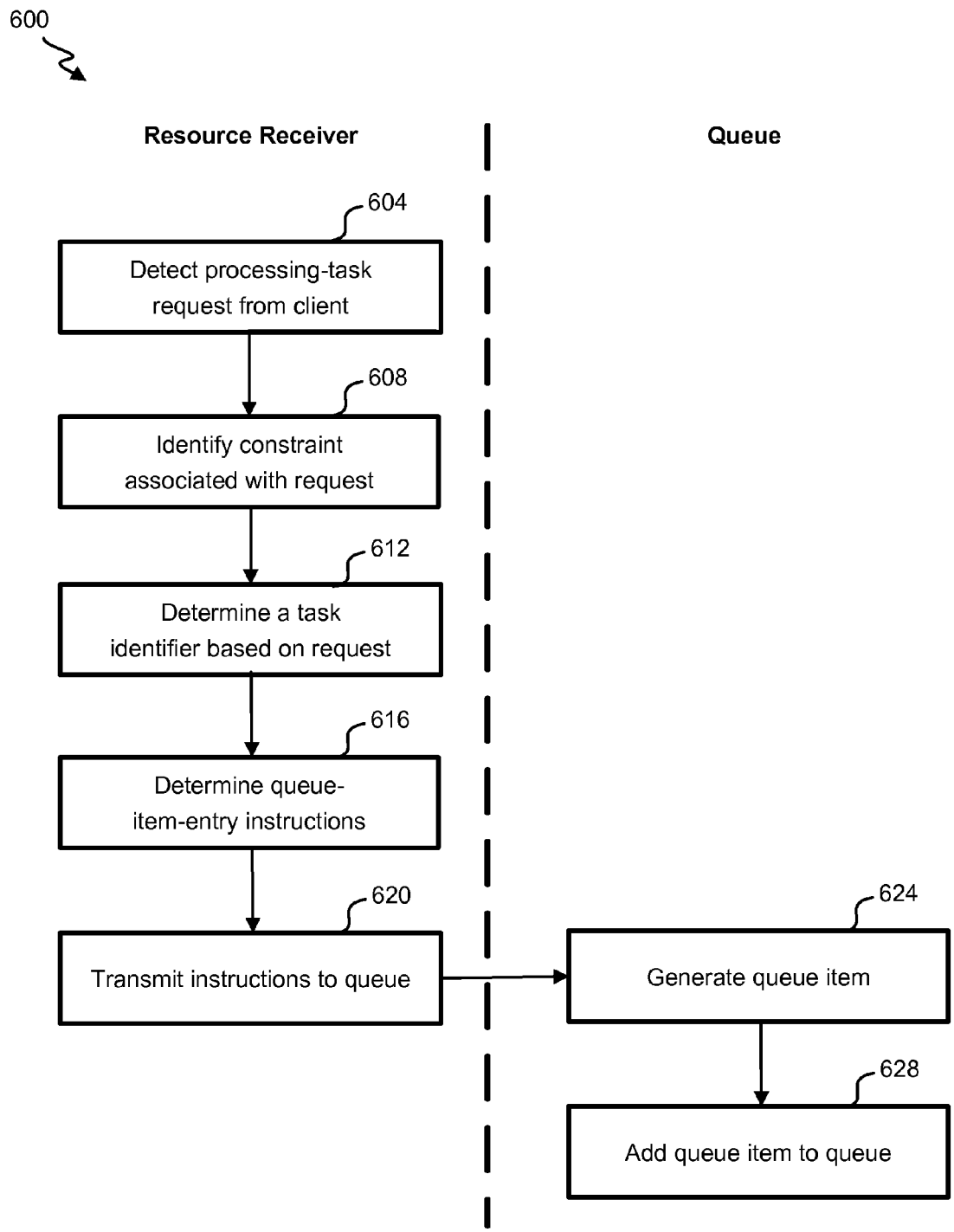
FIG. 6 illustrates a flowchart of an embodiment of a process for adding queue items to a queue.

With reference to FIG. 6, a flowchart of an embodiment of a process 600 for adding queue items to a queue 305 is shown. The depicted portion of the process 600 begins in block 604 where request detector 405 detects a processing-task request from a client 350. At block 608, constraint engine 410 identifies a constraint associated with the request (e.g., based on constraints in the request and/or those set forth in one or more global or client policies). Identifying the constraint can include evaluating whether a policy condition is satisfied and/or resolving conflicts between constraints. At block 612, instruction generator 430 determines a task identifier based on the request instruction generator 430 can determine the task identifier by, e.g., selecting a task identifier from task identifier database 435 or by generating the identifier (e.g., by appending characters to a task identifier in task identifier database 435).

At block 616, instruction generator 430 determines queue-item-entry instructions based on the request and constraint. The instructions can include the task identifier and/r processing-task fields, such as a file name, a location where the file is stored, a desired format into which the file is to be transcoded to, a location where the processed file is to be stored, expected processing time, expected requisite storage space associate with the task, a client-importance indicator of the task (e.g., a numerical value along a range), a deadline, etc. At block 620, queue communicator 440 transmits instructions to queue 305 (e.g., via a network).

At block 624, queue 305 generates a queue item based on the instructions. The queue item can include one processing task, multiple processing tasks or part of a processing task. The queue item can identify a client and/or resource associated with the item and/or a status (e.g., identified as open initially). These identifications can include values in queue-item fields or can be performed by adding the item to a selective list (e.g., an "open" list or a list associated with a particular client). At block 628, queue 305 adds the queue item to queue 305.

Figure 7:
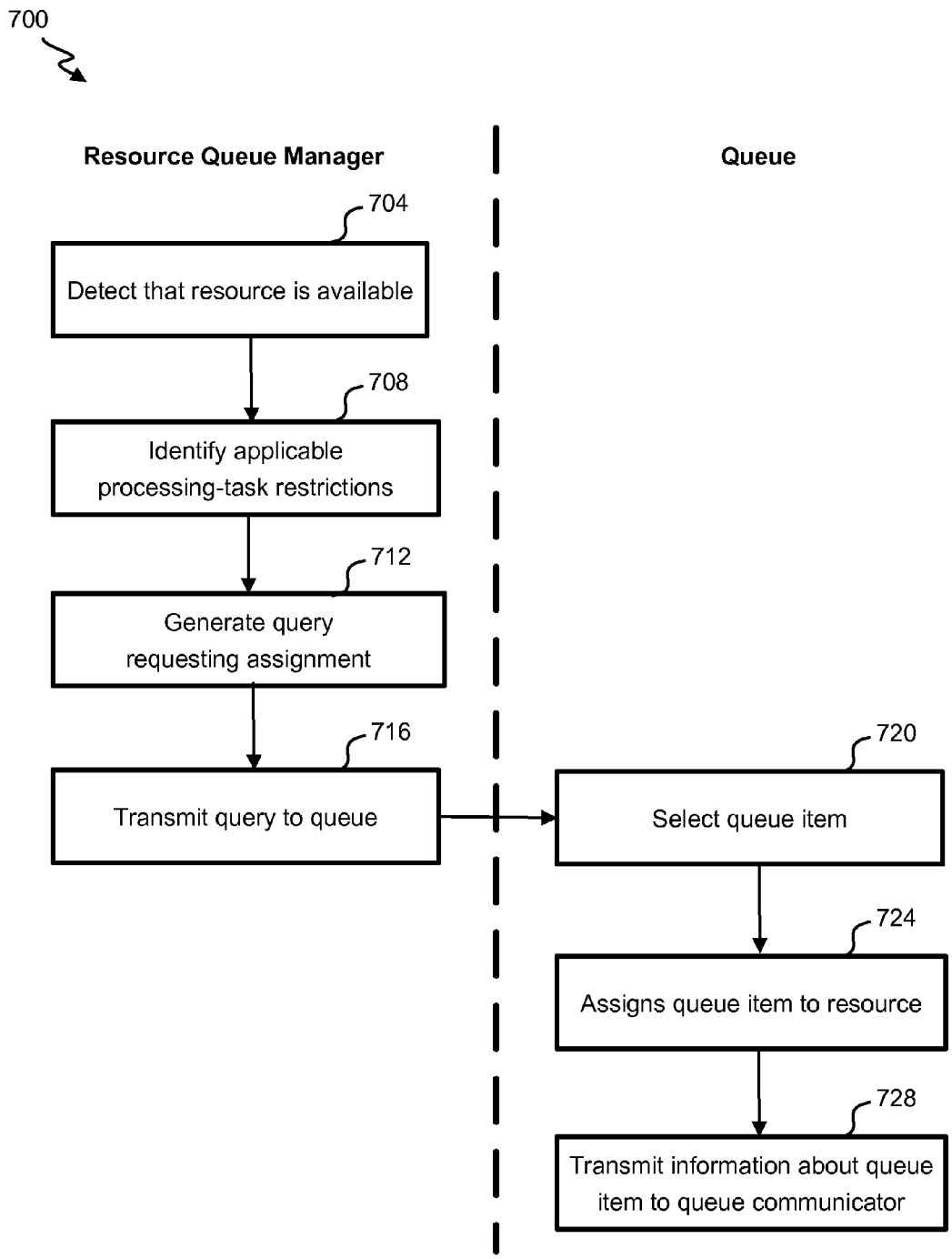
FIG. 7 illustrates a flowchart of an embodiment of a process for assigning a queue item from queue 305 to a resource.

With reference to FIG. 7, a flowchart of an embodiment of a process 700 for assigning a queue item from queue 305 to a resource 310 is shown. The depicted portion of the process 700 begins in block 704 where availability detector 505 detects that a resource 310 is available to perform a processing task. The availability can be detected, e.g., based on detecting that a time-averaged CPU usage is below a threshold or by detecting that item status manager 560 recently detected and/or reported that a previously assigned queue item was completed.

At block 708, restriction engine 510 identifies applicable processing-task restrictions. The restrictions can be identified based on local capabilities, empirical local performance, client policies and/or global policies. In one instance, a global policy indicates that if any queue item is associated with a client assigned to the resource, one such queue item is to be assigned. Otherwise, a queue item associated with another client is to be assigned. The another client can be selected as a client for which the instant resource has performed relatively few processing tasks for during a time period. For example, the another client can include any client for which fewer than a threshold number of tasks within a time period have been performed and/or for which the resource has spent less than a threshold amount of processing time for within the time period. If more than one client meet these criteria, a client can be pseudo-randomly selected amongst the qualifying clients. As another example, the another client can include a client for which a delay between a current time and a most recently performed processing task performed by the resource is the longest amongst all clients. As yet another example, the another client can include a client for which a fewest number of tasks within a time period were performed and/or for which the resource spent the smallest amount of processing time for within the time period amongst all clients. Other restrictions can additionally or alternatively be identified. For example, after a client has been identified, a specific queue item can be identified based on a task priority (e.g. such that, for a given content object, downloading is performed before transcoding, or transcoding into a first format is performed before transcoding into a second format), a content-object priority (e.g., such that queue items associated with content objects having a high importance or popularity metric are preferred to other queue items), and/or an age of the queue items (e.g., such that older queue items are preferred to newer queue items).

At block 712, query generator 550 generates a query requesting a queue-item assignment and identifying the restrictions. At block 716, queue communicator 555 transmits the query to queue 305 (e.g., via a network, such as the Internet 104). At block 720, queue 305 selects a queue item in view of the restrictions. The selected queue item can include a queue item that meets any criteria restrictions and that is most preferred based on any priority restrictions. If multiple queue items equally meet the criteria, a queue item can be pseudo-randomly selected from the multiple items. At block 724, queue 305 assigns the queue item to resource 310. For example, a value of a status field of the queue item can be changed (e.g., from open to assigned) or the queue item can be moved between lists or sheets. At block 728, queue 305 transmits information about the queue item to queue communicator 555 (e.g., identifying one or more assigned processing tasks and information needed to perform the tasks, such as a content-object location).

Figure 8:
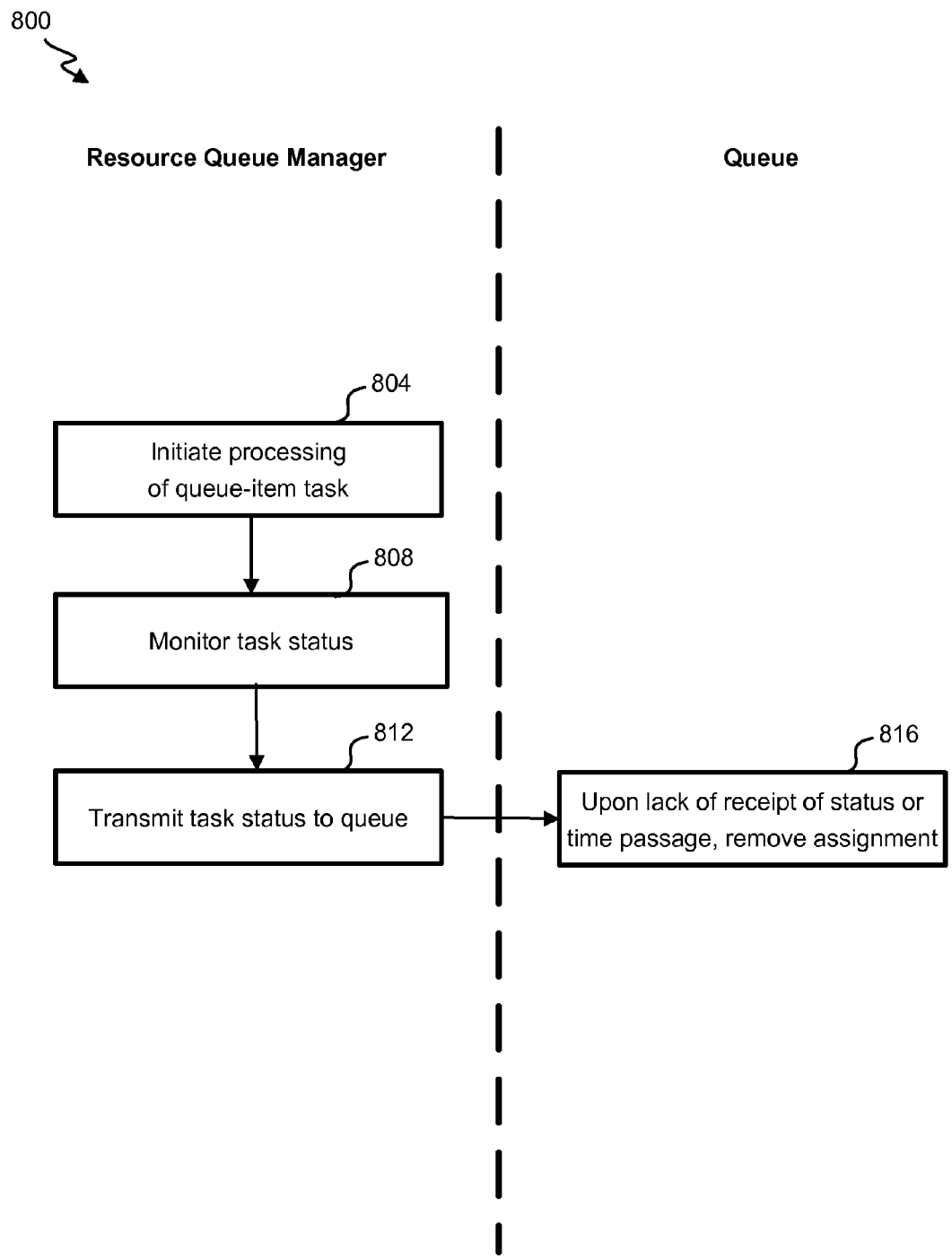
FIG. 8 illustrates a flowchart of an embodiment of a process for updating a queue in response to poor task performance.

With reference to FIG. 8, a flowchart of an embodiment of a process 800 for updating a queue 305 in response to poor task performance is shown. The depicted portion of the process 800 begins in block 804 where queue communicator 555 initiates processing of a task in an assigned queue item by an assigned resource 350 (e.g., that includes queue communicator 555). At block 808, item status manager 560 monitors a status of task. For example, item status manager 560 can monitor CPU cycles to determine whether resource 350 is working on a task, can monitor a storage space to determine whether intermediate files are being created or can monitor a percent completion of a task.

At block 812, queue communicator 555 transmits a status to queue. The status can include a specific status (e.g., a percent completion of a task or queue item or an expected completion time) or a general status (e.g., "pending"). In some instances, the mere transmission is indicative that resource 350 is continuing to work on the queue item. Thus, the task status can include a ping or simple signal that identifies the resource. Item status manager 560 can be expected to transmit such task statuses at routine intervals or at specific times, which may be predefined or defined in the information transmitted about the queue item. For example, item status manger 560 may always be expected to send status updates at hour intervals after a queue-item assignment until completion, or an assignment can require item status manager 560 to send a status update four hours after an assignment if resource 350 is still working on the queue item.

Figure 9:
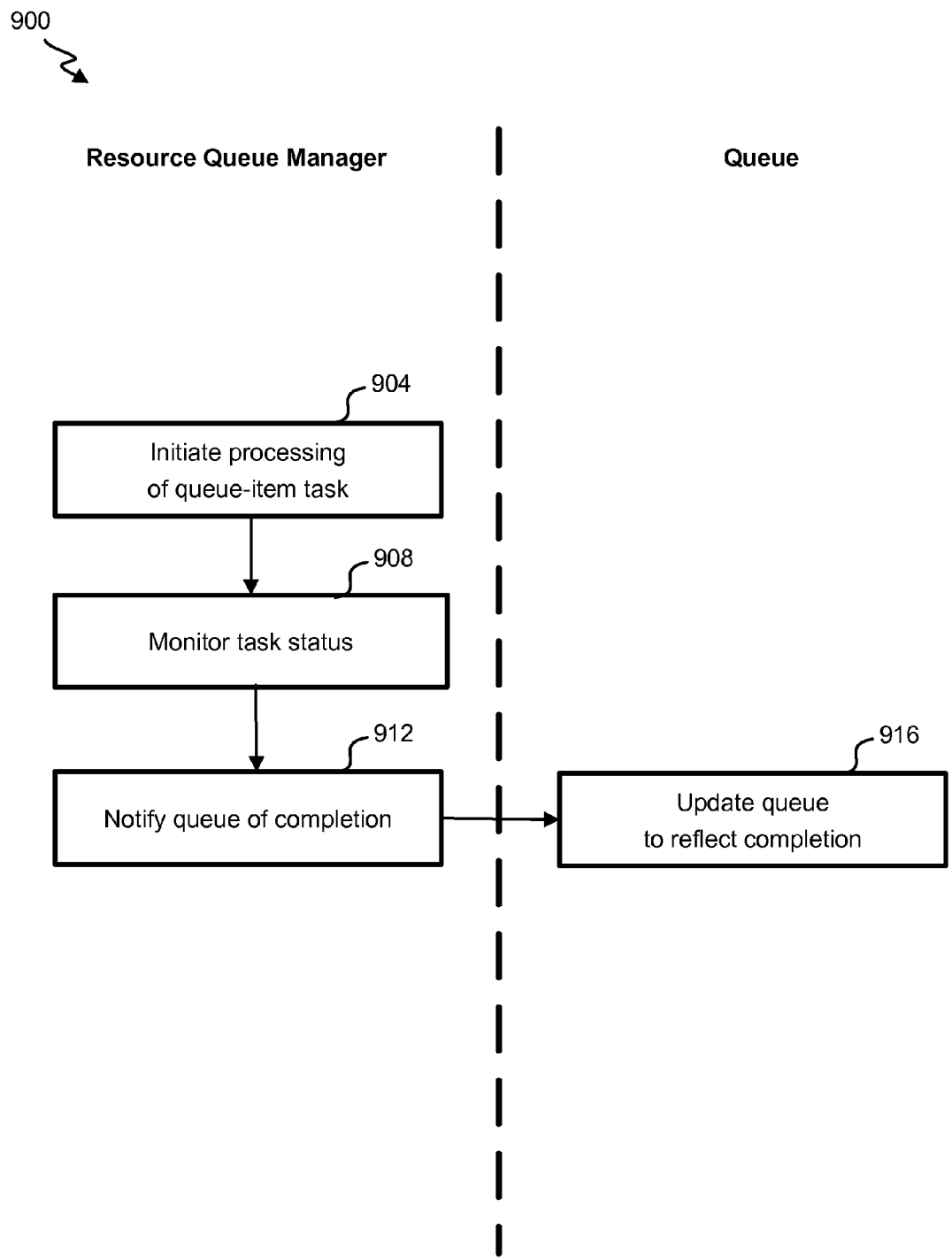
FIG. 9 illustrates a flowchart of an embodiment of a process for updating a queue in response to completed performance of a queue-item task.

At block 816, upon lack of receipt of expected status and/or upon passage of a particular time period, queue 305 removes an assignment of queue item. For example, if item status manager 560 is expected to check in at least once per hour after a queue-item assignment, if an assignment was made at 2:40, and if item status manager 560 checked in at 3:30 but not thereafter, at 4:31 queue 305 can estimate that there is a problem with resource 350 and remove the assignment. Thus, if a resource breaks down or is taken offline, an assigned queue item can be removed such that it can be reassigned. In some instances, reassignment can occur after a time period even in spite of status updates. For example, a queue item or general policy can indicate that performance of the item is not to take more than 4 hours. If a resource 350 is working on the queue item for longer than 4 hours (e.g., due to hung processing), the queue item's assignment can be removed such that it can be reassigned With reference to FIG. 9, a flowchart of an embodiment of a process 900 for updating a queue 305 in response to completed performance of a queue-item task is shown. Blocks 904 and 908 of process 900 parallel blocks 804 and 808 of process 800. At block 912, queue communicator 555 notifies queue 305 of completion of tasks in the queue item. The notification can include a result of the completion (e.g., successful or a specific error). At block 916, queue 305 updates queue 305 to reflect the completion (e.g., by removing the queue item from the queue, changing a value of a status field, etc.).

Figure 10:
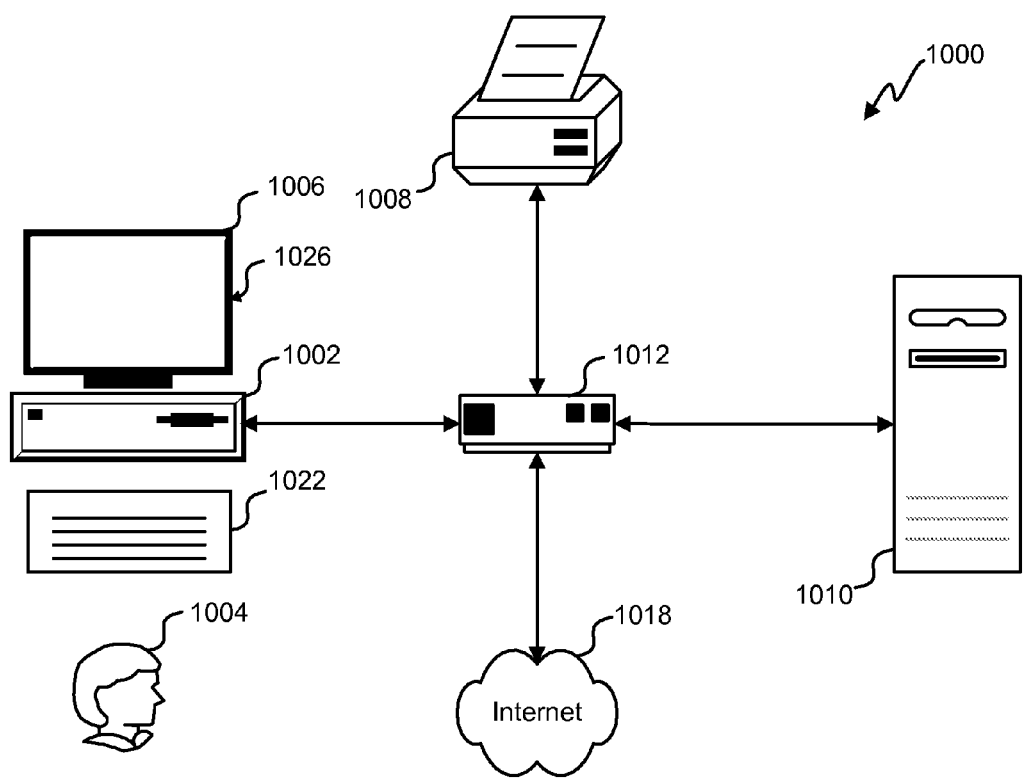
FIG. 10 depicts a block diagram of an embodiment of a computer system.

Referring next to FIG. 10, an exemplary environment with which embodiments may be implemented is shown with a computer system 1000 that can be used by a designer 1004 to design, for example, electronic designs. The computer system 1000 can include a computer 1002, keyboard 1022, a network router 1012, a printer 1008, and a monitor 1006. The monitor 1006, processor 1002 and keyboard 1022 are part of a computer system 1026, which can be a laptop computer, desktop computer, handheld computer, mainframe computer, etc. Monitor 1006 can be a CRT, flat screen, etc.

A designer 1004 can input commands into computer 1002 using various input devices, such as a mouse, keyboard 1022, track ball, touch screen, etc. If the computer system 1000 comprises a mainframe, a designer 1004 can access computer 1002 using, for example, a terminal or terminal interface. Additionally, computer system 1026 may be connected to a printer 1008 and a server 1010 using a network router 1012, which may connect to the Internet 1018 or a WAN.

Server 1010 may, for example, be used to store additional software programs and data.

In one embodiment, software implementing the systems and methods described herein can be stored on a storage medium in server 1010. Thus, the software can be run from the storage medium in server 1010. In another embodiment, software implementing the systems and methods described herein can be stored on a storage medium in computer 1002. Thus, the software can be run from the storage medium in computer system 1026. Therefore, in this embodiment, the software can be used whether or not computer 1002 is connected to network router 1012. Printer 1008 may be connected directly to computer 1002, in which case, computer system 1026 can print whether or not it is connected to network router 1012.

Figure 11:
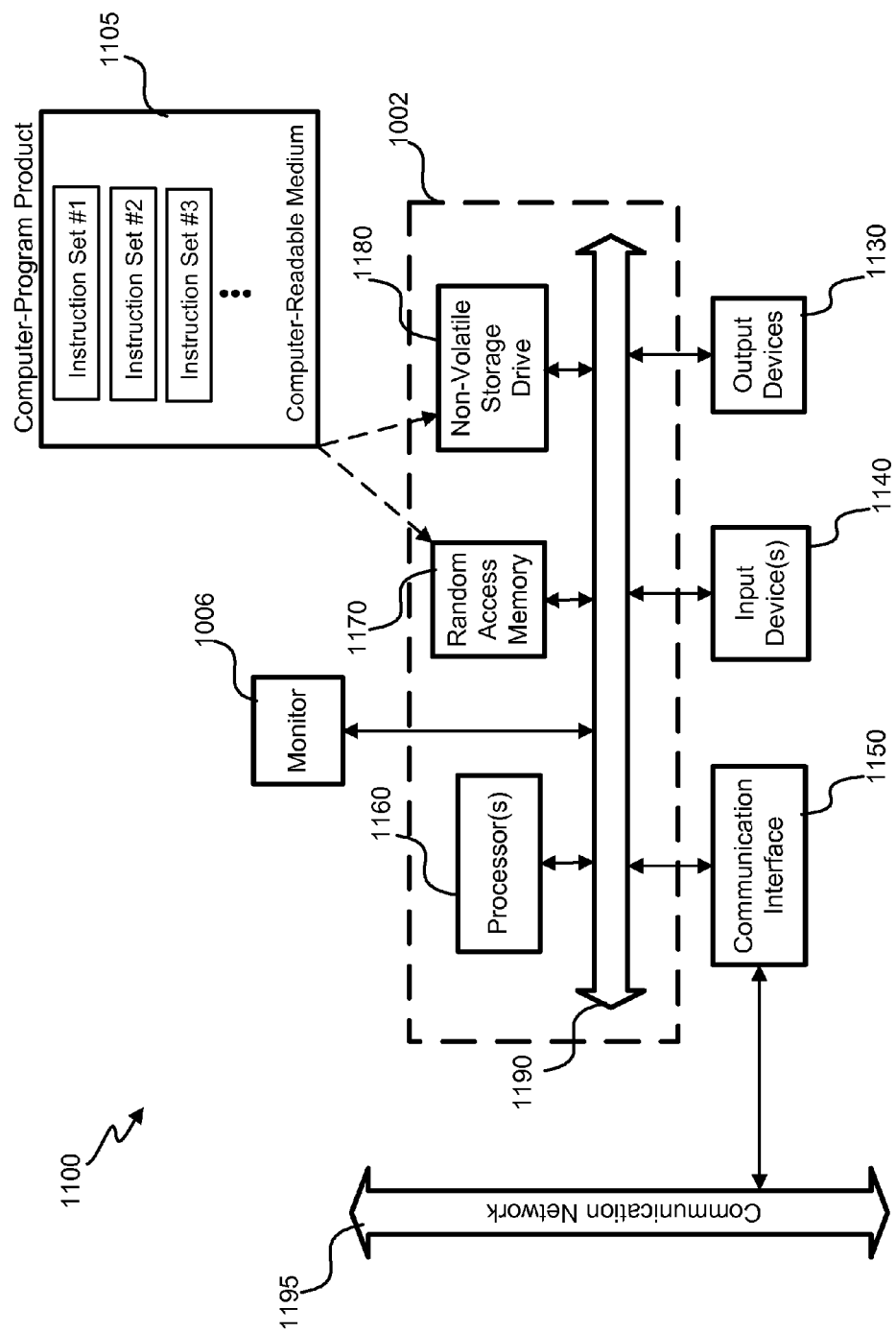
FIG. 11 depicts a block diagram of an embodiment of a special-purpose computer system.

With reference to FIG. 11, an embodiment of a special-purpose computer system 1100 is shown. Resource 310 is an example of a special-purpose computer system 1100. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1026, it is transformed into the special-purpose computer system 1100.

Special-purpose computer system 1100 comprises a computer 1002, a monitor 1006 coupled to computer 1002, one or more additional user output devices 1130 (optional) coupled to computer 1002, one or more user input devices 1140 (e.g., keyboard, mouse, track ball, touch screen) coupled to computer 1002, an optional communications interface 1150 coupled to computer 1002, a computer-program product 1105 stored in a tangible computer-readable memory in computer 1002. Computer-program product 1105 directs system 1100 to perform the above-described methods. Computer 1002 may include one or more processors 1160 that communicate with a number of peripheral devices via a bus subsystem 1190. These peripheral devices may include user output device(s) 1130, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 may be stored in non-volatile storage drive 1190 or another computer-readable medium accessible to computer 1002 and loaded into memory 1170. Each processor 1160 may comprise a microprocessor, such as a microprocessor from Intel® or Advanced Micro Devices, Inc.®, or the like. To support computer-program product 1105, the computer 1002 runs an operating system that handles the communications of product 1105 with the above-noted components, as well as the communications between the above-noted components in support of the computer-program product 1105. Exemplary operating systems include Windows® or the like from Microsoft Corporation, Solaris® from Sun Microsystems, LINUX, UNIX, and the like.

User input devices 1140 include all possible types of devices and mechanisms to input information to computer system 1002. These may include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1006 via a command such as a click of a button or the like. User output devices 1130 include all possible types of devices and mechanisms to output information from computer 1002. These may include a display (e.g., monitor 1006), printers, non-visual displays such as audio output devices, etc.

Communications interface 1150 provides an interface to other communication networks and devices and may serve as an interface to receive data from and transmit data to other systems, WANs and/or the Internet 1018. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 may be coupled to a computer network, to a FireWire® bus, or the like. In other embodiments, communications interface 1150 may be physically integrated on the motherboard of computer 1002, and/or may be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 may be configured to store the basic programming and data constructs that provide the functionality of various embodiments of the present invention, as described above.

Software instruction sets that provide the functionality of the present invention may be stored in RAM 1170 and non-volatile storage drive 1180. These instruction sets or code may be executed by processor(s) 1160. RAM 1170 and non-volatile storage drive 1180 may also provide a repository to store data and data structures used in accordance with the present invention. RAM 1170 and non-volatile storage drive 1180 may include a number of memories including a main random access memory (RAM) to store of instructions and data during program execution and a read-only memory (ROM) in which fixed instructions are stored. RAM 1170 and non-volatile storage drive 1180 may include a file storage subsystem providing persistent (non-volatile) storage of program and/or data files. RAM 1170 and non-volatile storage drive 1180 may also include removable storage systems, such as removable flash memory.

Bus subsystem 1190 provides a mechanism to allow the various components and subsystems of computer 1002 communicate with each other as intended. Although bus subsystem 1190 is shown schematically as a single bus, alternative embodiments of the bus subsystem may utilize multiple busses or communication paths within computer 1002.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FP- GAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A content delivery network (CDN) for assigning processing tasks, the CDN comprising:

a first points of presence (POP) at a first geographical location that includes a first resource, the first resource being assigned to a first client, wherein the first resource includes a queue manager that:
  detects when the first resource is available to perform a processing task,
  monitors usage of the first resource for performing processing tasks associated with each of a second client and a third client over a time period,
  identifies a restriction that specifies a type of processing task to be assigned to the first resource or a geographical locale for performance of the processing task, the restriction specifying that processing tasks associated with the prioritized client are to be assigned over comparable processing tasks associated with the unprioritized client, the prioritized client being whichever of a second client and a third client was associated with less monitored usage, and the unprioritized client being the other of the second and third client,
  generates a query identifying the restriction, and
  transmits the query to a queue;
a second POP at a second geographical location that includes a second resource, the second resource being assigned to the second client;
a third POP at a third geographical location that includes a third resource, the third resource being assigned to the third client; and
the queue, wherein the queue:
  is loaded into memory,
  includes a set of queue items, each queue item being associated with a client, and each queue item identifying a processing task,
  responds to queries from each of the first, second and third resources,
  upon receipt of the query, selects a queue item from the set of queue items based on the restriction,
  assigns the selected queue item to the first resource, and
  transmits a response to the first resource, the response identifying a processing task of the selected queue item.

2. The CDN for assigning processing tasks as recited in claim 1, wherein the monitored usage comprises an amount of processing time.

3. The CDN for assigning processing tasks as recited in claim 1, wherein the monitored usage comprises a number of queue items.

4. The CDN for assigning processing tasks as recited in claim 1, wherein the queue manager identifies a second restriction, the second restriction being based on a policy set by the first client,
  wherein the query identifies the second restriction, and
  wherein the queue selects the queue item further based on the second restriction.

5. The CDN for assigning processing tasks as recited in claim 1, wherein the restriction further specifies that processing tasks associated with the first client are to be assigned over processing tasks associated with the second client and over processing tasks associated with the third client.

6. The CDN for assigning processing tasks as recited in claim 1, wherein the first resource further includes a receiver that:
  receives a request from the first client,
  determines a task identifier based on the request, and
  transmits instructions to the queue to add a queue item, the instructions including the task identifier.

7. The CDN for assigning processing tasks as recited in claim 6, wherein the receiver further identifies a constraint based on a client policy, and wherein the determination of the task identifier depends on the constraint.

8. A resource for performing processing tasks within a content delivery network (CDN) having a plurality of points of presence geographically distributed, the resource comprising:
   an availability detector that detects when the resource is available to perform a processing task;
   a local-performance monitor that monitors usage of the resource for performing processing tasks associated with each client of a set of clients;
   a restriction engine that identifies a restriction that specifies a type of processing task to be assigned to the resource or a geographical locale for performance of the processing task, the restriction identifying a hierarchy amongst at least two clients of the set of clients, the hierarchy being based on the monitored usage;
   a query generator that generates a query identifying the restriction; and
   a queue communicator that:
      transmits the query to a remote queue in communication with a plurality of independent resources, the plurality of independent resources including the resource,
      receives a response from the queue, the response identifying a selected queue item, the selected queue item having been selected from a set of processing tasks based on the hierarchy, and
      stores the response from the queue in a memory, wherein:
         the memory and the resource are located within a first point of presence of the plurality of points of presence,
         the response identifies the selected queue item based on the restriction, and
         the selected queue item is assigned, by the queue, to the resource.

9. The resource for performing processing tasks as recited in claim 8, wherein the restriction is based on a global policy that applies to each of the plurality of resources.

10. The resource for performing processing tasks as recited in claim 8, further comprising a client-policy engine that receives a communication from a client and generates a client policy based on the communication, wherein the restriction engine further identifies a second restriction limiting which processing task is to be assigned to the resource, the second restriction depending on the client policy.

11. The resource for performing processing tasks as recited in claim 8, wherein a client assigned to the resource is at a top of the hierarchy.

12. The resource for performing processing tasks as recited in claim 8, further comprising an item status manager that monitors a status of performance of the selected queue item, and wherein the queue communicator transmits a communication to the queue, the communication being indicative of the status.

13. The resource for performing processing tasks as recited in claim 8, further comprising a receiver that:
   receives a request from a client,
   determines a task identifier based on the request, and
   transmits instructions to the queue to add a queue item, the instructions including the task identifier.

14. A method for performing processing tasks within a content delivery network (CDN) having a plurality of points of presence geographically distributed, the method comprising:
   detecting, at a resource located in a first point of presence of the plurality of points of presence, when the resource is available to perform a processing task;
   monitoring usage of the resource for performing processing tasks associated with each client of a set of clients;
   identifying a restriction that specifies a type of processing task to be assigned to the resource or a geographical locale for performance of the processing task, the restriction identifying a hierarchy amongst at least two clients of the set of clients, the hierarchy being based on the monitored usage;
   generating a query identifying the restriction;
   transmitting the query to a remote queue in communication with a plurality of independent resources, the plurality of independent resources including the resource; and
   receiving a response from the queue, wherein:
      the response identifies a selected queue item based on the restriction, and
      the selected queue item is assigned, by the queue, to the resource.

15. The method for performing processing tasks as recited in claim 14, wherein a client assigned to the resource is at a top of the hierarchy.

16. The method for performing processing tasks as recited in claim 14, further comprising:
   receiving a request from a client,
   determining a task identifier based on the request, and
   transmitting instructions to the queue to add a queue item, the instructions including the task identifier.

17. The method for performing processing tasks as recited in claim 16, wherein the task identifier indicates a constraint regarding which resources of the plurality of resources can perform an associated processing task.

18. The method for performing processing tasks as recited in claim 14, wherein the restriction is based on a global policy that applies to each of the plurality of resources.

19. The method for performing processing tasks as recited in claim 14, further comprising:
   receiving a communication from a client;
   generating a client policy based on the communication; and
   identifying a second restriction limiting which processing task is to be assigned to the resource, the second restriction depending on the client policy.

* * * * *